A. D. FENNO.
AUTOMOBILE LOCK.
APPLICATION FILED OCT. 21, 1918.
1,307,001.
Patented June 17, 1919.
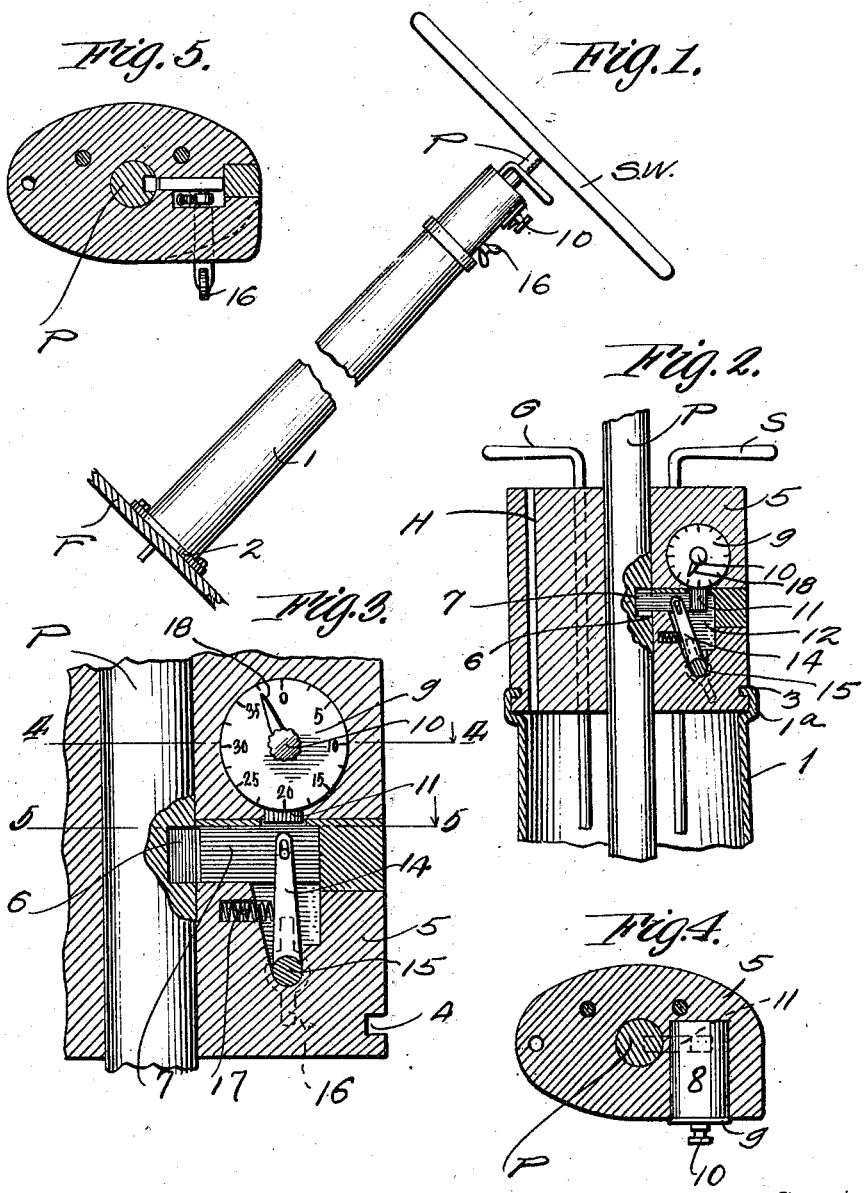

UNITED STATES PATENT OFFICE.

ARTHUR D. FENNO, OF ENID, OKLAHOMA.

AUTOMOBILE-LOCK.

1,307,001.   Specification of Letters Patent.   Patented June 17, 1919.

Application filed October 21, 1918. Serial No. 258,986.

*To all whom it may concern:*

Be it known that I, ARTHUR D. FENNO, a citizen of the United States, residing at Enid, in the county of Garfield and State of Oklahoma, have invented certain new and useful Improvements in Automobile-Locks, of which the following is a specification.

This invention relates to improvements in locks for automobiles to prevent them being stolen.

The object of the invention is to provide a simple and efficient lock for the steering post of a motor vehicle which cannot be manipulated except by the person cognizant of the combination.

Another object of the invention is to provide a lock of this character which cannot be removed bodily from the car without breaking the gas and sprocket levers thereby putting the car out of commission.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of a steering post equipped with this improved lock, parts being broken out for convenience in illustration, Fig. 2 is a detail longitudinal section through the lock showing the post in side elevation with parts broken out, Fig. 3 is a similar view on an enlarged scale, Fig. 4 is a transverse section taken on the line 4—4 of Fig. 3, and Fig. 5 is a similar view taken on the line 5—5 of Fig. 3.

In the embodiment illustrated, the lock constituting this invention this shown applied to the steering post P of a motor vehicle having the usual steering wheel SW and extending through the car floor F.

Surrounding the steering post P is a tubular metal casing 1 having an annular flange 2 at its lower end bolted to the car floor with the nuts of the bolt arranged on the lower side of the floor so that this casing cannot be detached from the outside. The upper end of this casing 1 has an offset 1ª with an inturned flange 3 at its end which is designed to enter a groove 4 in the lower end of a block 5 supported by said casing and through which the steering post P passes. This block 5 contains the locking mechanism for the post and also has longitudinal bores through which the gas lever G and the spark lever S pass as is shown clearly in Fig. 2. Another bore H is also provided in this block for the passage of the wires to the electric horn which are usually mounted on the steering post but may be of course positioned at any other desired point.

The post P has a recess 6 in one side which is incased by the block 5 and this block is also recessed and provided with a laterally slidable bolt 7 positioned to enter the recess 6 when projected. Rotatably mounted in the block 5, is a cylindrical casing 8 which projects at one end through one face of the block and carries on its outer end a dial 9 having an actuating thumb piece 10 with a pointer 18 connected therewith to be moved over dial 9 having numerals thereon to provide for the operation of a combination to retract bolt 11. A depending member 11 is carried by the casing 8 and is designed to cross the path of the bolt and enter a recess 12 below the bolt 7 so that the bolt is thus held in locking engagement with the recess 6 in the steering post.

A link 14 has a slot and pin connection with the bolt 7 and is carried by a rotary shaft 15 mounted in the block in a plane at right angles to bolt 7 and has one end projected through the block and provided with an operating handle 16. By turning this handle 16 the link 14 is moved toward the steering post against the tension of a coiled spring 17 to project the bolt into locking engagement with the post and when it reaches this position as shown in Fig. 2 the depending locked element 11 carried by the casing 8 drops into position behind the bolt and holds it securely in locked engagement with the steering post. A coiled spring 17 is positioned in the recess in the block 5 and engages the link 14 exerting its tension to normally retract the bolt 7 and hold it out of engagement with the steering post.

From the above description it will be obvious that when the driver leaves his car, all that is necessary for him to do is to turn the handle 16 to project the bolt 7 into engagement with the recess 6 in the steering post and immediately he does this the locking element 11 will drop behind the bolt and hold it projected until it is released by turning the hand member 10 of the cylinder 8 to withdraw the element 11. Immediately said element 11 is withdrawn the coiled spring 17 will exert its tension to move the link 14 outwardly and thereby retract the bolt 7 permitting the steering post to be turned in the usual manner.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. The combination with a steering post having a recess in one side wall, a block encircling said post and having another recess registering with the recess in the post, a bolt mounted in the recess of said block and adapted to enter the recess in the post, a rotary shaft carried by said block with an actuating member projecting through one side wall thereof, a link mounted in the block recess and fixed to said shaft, said link having a slot and pin connection with said bolt, a coiled spring engaging said link to normally retract the bolt, and means movable across the path of the bolt at the rear thereof to hold the bolt in projected position.

2. The combination with a steering post having a recess in one side wall, a block encircling said post and having another recess registering with the recess in the post, a bolt mounted in the recess of said block and adapted to enter the recess in the post, a rotary shaft carried by said block with an actuating member projecting through one side wall thereof, a link mounted in the block recess and fixed to said shaft, said link having a slot and pin connection with said bolt, a coiled spring engaging said link to normally retract the bolt, a rotary member mounted in said block and having a depending element adapted to extend across the path of the bolt at the rear thereof to hold it in projected position.

3. The combination with a steering post having a recess in one side wall, a member encircling said post and secured to prevent removal therefrom, a bolt mounted to slide in said member and to enter the recess of said post, spring pressed means for normally holding the bolt in retracted position, means for actuating said spring pressed means to project the bolt, a circular member mounted in said post encircling member and having a depending element positioned to drop behind the bolt when projected whereby the bolt is locked against withdrawal, and means for withdrawing said member to release the bolt.

In testimony whereof I affix my signature in presence of two witnesses.

ARTHUR D. FENNO.

Witnesses:
L. F. MESSMAN,
EVA MCKAY.